(12) United States Patent
Laessler

(10) Patent No.: US 10,584,806 B2
(45) Date of Patent: Mar. 10, 2020

(54) SELF-OPERATED REGULATOR

(71) Applicant: SAMSON AKTIENGESELLSCHAFT, Frankfurt (DE)

(72) Inventor: Rudolf Laessler, Maintal (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 0 days.

(21) Appl. No.: 15/572,413

(22) PCT Filed: May 6, 2016

(86) PCT No.: PCT/EP2016/060164
§ 371 (c)(1),
(2) Date: Nov. 7, 2017

(87) PCT Pub. No.: WO2016/177874
PCT Pub. Date: Nov. 10, 2016

(65) Prior Publication Data
US 2018/0106393 A1  Apr. 19, 2018

(30) Foreign Application Priority Data

May 7, 2015 (DE) .................. 10 2015 005 921

(51) Int. Cl.
*F16K 37/00* (2006.01)
*G05D 16/06* (2006.01)
(Continued)

(52) U.S. Cl.
CPC ........ *F16K 37/0041* (2013.01); *F15B 15/202* (2013.01); *F15B 15/2807* (2013.01);
(Continued)

(58) Field of Classification Search
CPC .......... Y10T 137/8242; F16K 37/0041; F16K 37/0033; G05D 16/0663; G05D 16/0647; G05D 16/0672
See application file for complete search history.

(56) References Cited

U.S. PATENT DOCUMENTS 5,144,977 A * 9/1992 Eggerton ............ F16K 37/0033
137/554
5,348,036 A * 9/1994 Oksanen .................. G05D 7/03
137/1
(Continued)

FOREIGN PATENT DOCUMENTS

CN        204254011 U    4/2015
DE    102008011701 A1    9/2009
(Continued)

OTHER PUBLICATIONS

International Search Report for PCT/EP2016/060164 dated Sep. 30, 2016.

*Primary Examiner* — Atif H Chaudry
(74) *Attorney, Agent, or Firm* — Schiff Hardin LLP

(57) ABSTRACT

A self-operated regulator can be configured to control a stream of working fluid, such as of a processing plant. The self-operated regulator can include a control valve and a control actuator configured to receive supply energy for the provision of an operating force exclusively from the stream of working fluid and/or from the working fluid for operating the control valve. A magnetic field source can be coupled to the control valve such that the magnetic field source follows the movement of the control valve to determine the movement using, for example, a magnetic sensor. The position of the control valve can be detected based on the determined movement.

18 Claims, 1 Drawing Sheet

(51) Int. Cl.

| | |
|---|---|
| *F15B 15/20* | (2006.01) |
| *F15B 15/28* | (2006.01) |
| *F16K 27/04* | (2006.01) |
| *F16K 31/122* | (2006.01) |
| *F16K 31/42* | (2006.01) |

(52) U.S. Cl.
CPC ............ *F16K 27/04* (2013.01); *F16K 31/122* (2013.01); *F16K 31/42* (2013.01); *F16K 37/0033* (2013.01); *G05D 16/0647* (2013.01); *G05D 16/0663* (2013.01); *G05D 16/0672* (2013.01); *Y10T 137/8242* (2015.04)

(56) References Cited

U.S. PATENT DOCUMENTS

| | | |
|---|---|---|
| 9,103,460 B2 | 8/2015 | Moedinger et al. |
| 2003/0233203 A1 | 12/2003 | Grumstrup et al. |
| 2007/0091519 A1* | 4/2007 | Abe ................. H01F 38/14 361/38 |
| 2010/0173736 A1* | 7/2010 | Basile ............... G01B 11/272 474/113 |
| 2013/0158812 A1* | 6/2013 | Olson ............... H05K 999/99 701/50 |
| 2013/0233416 A1* | 9/2013 | Uwe ................. F15B 15/202 137/554 |
| 2016/0025765 A1* | 1/2016 | Panther ............. G01B 21/00 702/150 |

FOREIGN PATENT DOCUMENTS

| | | |
|---|---|---|
| DE | 102010050662 A1 | 5/2012 |
| DE | 102012003231 B3 | 3/2013 |
| GB | 2449680 A | 12/2008 |

\* cited by examiner

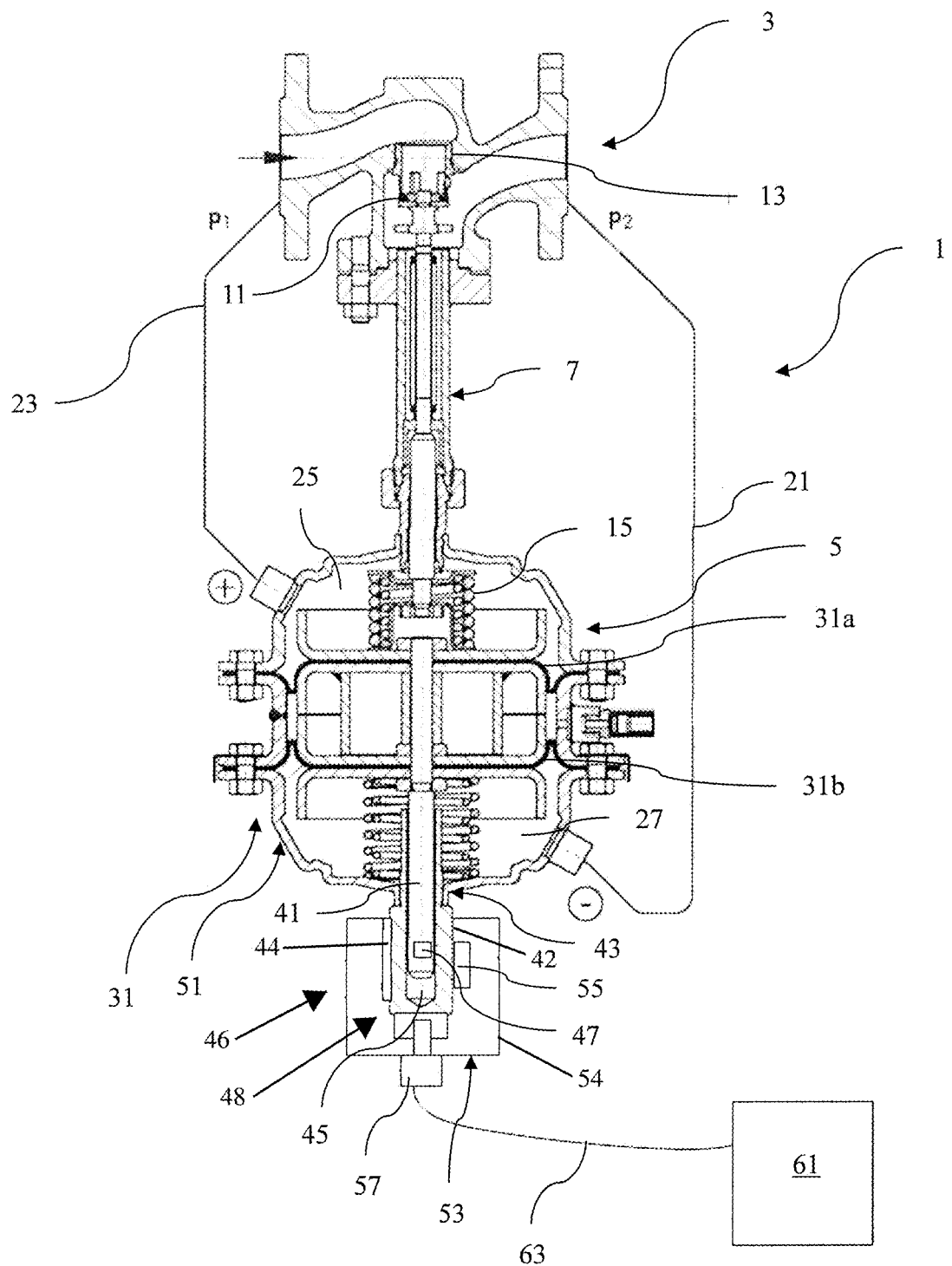

SELF-OPERATED REGULATOR

CROSS REFERENCE TO RELATED APPLICATIONS

This patent application is a national stage application filed under 35 U.S.C. 371 based on PCT International Application No. PCT/EP2016/060164, filed May 6, 2016, which claims the benefit of priority of and to German Patent Application No. 10 2015 005 921.1, filed May 7, 2015, each of which is incorporated herein by reference in its entirety.

BACKGROUND

The present disclosure relates to a self-operated regulator (controller without auxiliary power) for controlling a stream of working fluid, in particular of a processing plant such as a plant consisting of gas suppliers, hot water suppliers, and in particular waste water suppliers and/or heat suppliers, or a heating and/or cooling system in particular for a property, a district heating system or the like, or of a plant for heating and cooling process fluids, in particular industrial process fluids. Self-operated regulators are also used in explosion-hazardous plants because the lack of additional auxiliary power brings about a significant reduction in the risk of explosion.

A self-operated regulator requires no external energy supply to operate the regulator, in particular no electronic power supply and no pneumatics, such as no external pneumatic continuous pressure supply, to implement the pre-adjusted or variable open-loop or closed-loop control algorithm. The self-operated regulator comprises a control valve and a control actuator configured for mechanically operating the control valve, wherein the supply of energy for the provision of an operating force for actuating the control valve is obtained exclusively from the stream of working fluid which is to be adjusted, or from the working fluid itself. This differentiates a self-operated regulator for process plants from a regulator operated by auxiliary energy in the fact that no additional controllable operating energy (in addition to the energy already existing in the working fluid or in the working fluid stream), such as electric power or pneumatics, must be added to the regulator to be able to complete its actuation task, as well as its measurement and/or control function.

The open-loop/closed-loop control of a regulator for a processing plant comprises in particular only three essential functions, namely measuring a control variable, regulating the control variable, and implementing the control movement in accordance with a regulation and/or control routine. Since the self-operated regulator requires no external auxiliary power supply, the operating costs and the installation costs are low, on account of the absence of an additional power supply.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 shows a self-operated regulator according to according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

In order to ensure the proper functioning of the self-operated regulator, it is important to correctly coordinate the components relating to the main functions referred to above. A self-operated regulator has proven to be a cost-effective and operationally robust component. The self-operated regulator is frequently used, particularly in safety-relevant applications, because even in the event of failure of the plant power supply it can continue to work reliably.

An object of the present disclosure is to overcome disadvantages of the prior art, including to improve a self-operated regulator for controlling a working fluid flow in particular of a processing plant to ensure that the correct functioning of the self-operated regulator, in particular in relation to its closed-loop/open-loop control and/or functionality in the field, can be verified without having to depart from the basic principle of the absence of an external power supply.

In an exemplary embodiment of the present disclosure, a self-operated regulator is provided. The self-operated regulator can be configured to control a working fluid stream, in particular of a processing plant, such as a gas supply system, water supply system and/or heating supply system (e.g. a heating and/or cooling system, such as from building services system or a district energy and heating system). The self-operated regulator in accordance with the present disclosure can be used to control, for example, temperature, pressure, volume flow or differential pressure, but is not limited thereto. In an exemplary embodiment, the self-operated regulator has a control valve, which can change a flow cross-section for the working fluid stream with respect to a valve seat, and a control actuator, which is configured to operate the control valve in such a way that supply energy for the provision of the operating force is obtained exclusively from the working fluid stream and/or from the working fluid. In an exemplary embodiment, the self-operated regulator can be configured to exploit different control variables of the working fluid stream, such as pressure difference and temperature difference, but also differences in density, as a source of energy. From the different physical parameters of the working fluid stream, by using appropriate energy conversion, sufficient energy can be provided to operate the positioning of the control valve, for example, under the constraints of a regulation based on constant target/actual value comparison.

In an exemplary embodiment, the self-operated regulator has a magnetic field source, such as a magnet (e.g. a permanent magnet), which is structurally coupled to the control valve such that the magnetic field source follows the movement of the control valve and the movement thereof can be detected using, for example, a magnetic sensor to determine the position of the control valve, in particular relative to the valve seat. In an exemplary embodiment, the magnetic sensor includes processor circuitry that is configured to perform one or more operations and/or functions of the magnetic sensor, including, for example, detecting one or more magnetic fields (e.g. from the magnetic field source). The magnetic sensor can also form part of the self-operated regulator. According to an exemplary embodiment of the present disclosure, the magnetic sensor does not need to be pre-installed on the self-operated regulator, but can be installed on already existing self-operated regulators (e.g. in a removable manner), for example for retrofitting, upgrading and/or for short-term measuring tasks. For this purpose, in an exemplary embodiment, the self-operated regulator can comprise a docking or receiving station, which can be occupied by a mobile, in particular standardized, magnetic sensor, such as an Anisotropic Magneto-Resistive (AMR) sensor, either in a stationary position or fixed to the regulator housing. The docking station can be implemented on a housing part of the regulator, such as the control valve housing or the control actuator housing or a part thereof, to ensure a stationary docking position of the magnetic sensor, in particular relative to the movably mounted magnetic field source, which is in particular protected and guided by the housing. In an exemplary embodiment, the magnetic sensor includes one or more magnetic sensor elements (e.g. magnetic sensor circuits), such as one or more Hall elements and/or AMR sensors. The magnetic sensor can comprise additional electronic components or logic blocks in addition to the magnetic sensor element(s), such as a diagnosis device etc., does not need to be permanently coupled with the regulator according to the present disclosure. Instead, in an exemplary embodiment, the docking station on the housing of the regulator could be configured only for short-term docking and fixed positioning of a mobile (hand-held) magnetic sensor, so that an operator can place the mobile magnetic sensor on the regulator housing and hold it in a fixed position, to directly detect the current position of the control valve on the basis of the permanent magnetic field of the magnetic field source. After the measurement, the operator can remove the magnetic sensor and perform a subsequent measurement on another self-operated regulator. In order that the logic components or diagnosis devices of the magnetic sensor can detect specific characteristics and unique identifying features of the regulator to be checked, the magnetic sensor can include a reader device, which can scan specific device information such as a bar code, attached for example to the outer side of the regulator, so that the device-specific measurement is then possible using the in particular standardized magnetic sensor.

In an exemplary embodiment, the magnetic sensor can be part of the self-operated regulator, in particular positioned either directly on the outer side of the regulator housing, or even on the inner side, in which case a corresponding data transfer function to the outside should be provided. In an exemplary embodiment, the magnetic sensor does not need an independent power source, instead the energy source can be placed, for example by an operator, as a mobile device on the self-operated regulator, so that the energy to power the sensor is communicated temporarily and by contactless means. The position detection is performed only within the brief period of the energy supply.

In an exemplary embodiment of the present disclosure, the magnetic sensor may also be implemented by a magnetic needle, like a compass needle, which depending on the position of the magnet, in particular permanent magnet mounted on the control valve, follows the magnetic field lines of the permanent magnet so that the position can be indicated visually by the magnetic needle.

Should the magnetic sensor be mounted on the self-operated regulator, an initialization of the position measurement can be made in advance in an exemplary embodiment. In one or more embodiments where the magnetic sensor is mounted externally, a positional stop can be provided for initializing the measurement position. It should be clear that the magnetic field source can also be arranged on a control valve rod using incremental magnetic sections to provide an incremental measurement result.

In an exemplary embodiment of the present disclosure, the docking station for the magnetic sensor can be configured in such a way that a fixed axial and radial position of the magnetic sensor to be docked is defined relative to the magnetic field source when the magnetic sensor is firmly applied or inserted in the docking location. In particular, the magnetic sensor docking receptacle has a fixing device (also referred to as a fixer) to fix (e.g. releasably fix) the magnetic sensor in the docked position. In an exemplary embodiment, the docking station comprises a translational sliding bearing 42, via which the magnetic sensor 53 or the magnetic sensor element 55 can be inserted into a docking end position 46, wherein a docking stop 44 limits the final position in the translational contacting direction. In an exemplary embodiment, a fixing device can be configured to prevent a displacement of the magnetic sensor towards the contacting direction to hold the magnetic sensor stationary with respect to the magnetic field source moving relative thereto. In an exemplary embodiment, cylindrical sliding bearing surfaces can be formed on both the regulator housing and on the magnetic sensor housing, according to a male/female arrangement (or protrusion/recess-arrangement). The operator can also hold the measuring sensor in place during the measurement.

The housing structure of the regulator (ROH), in particular at least along a movement range or movement amplitude of the magnet, can be formed by a non-magnetic material, so that the magnetic field generated by the magnetic field source remains unaffected by the housing surrounding the magnetic field source. The following are non-limiting examples of non-magnetic materials: aluminum, austenitic steel, brass, bronze, plastic or the like.

In an exemplary embodiment, the magnetic field source is attached to a control rod force-fittingly coupled to the control valve or is housed completely surrounded by control rod material, wherein in particular an attachment position is arranged on the control rod in the area of an axial end of the control rod opposite to the control valve and/or on a side of the control actuator facing away from the control valve.

In an exemplary embodiment, the magnetic field source is arranged within a non-magnetic end section of a force transmission of the control actuator, which is connected to the control valve in a force-fitting or movably-fixed manner. The non-magnetic material of the end section can be, for example, aluminum, austenitic steel, brass, bronze, plastic, but is not limited thereto. In an exemplary embodiment, the magnetic field source can be completely surrounded, in particular encapsulated or overmolded, by the non-magnetic material. For example, a permanent magnet can be fully embedded in an aluminum material or plastic, forming a control rod. In this way, the magnetic field source is protected against external and internal corrosion effects.

In an exemplary embodiment, the self-operated regulator according to the present disclosure comprises the magnetic sensor, which is arranged outside of a housing in such a way that any further relative movement between the magnetic sensor and the magnetic field source can be detected. In an exemplary embodiment, the above described docking station can already be occupied by a magnetic sensor. The arrangement of the magnetic sensor in the docking station can be permanent or detachable, to allow the magnetic sensor to be replaced.

While the magnetic field source is accommodated inside the housing, e.g. the control valve housing, the control actuator housing, or another housing structure which can form, for example, a lantern structure, a bonnet structure, or a regulator housing enclosure, the magnetic sensor is located in particular outside of the housing.

In an exemplary embodiment, the magnetic sensor is coupled to a display and/or a diagnosis device (also referred to as a diagnosis control), in particular in a signal conducting manner. The display can be configured to display the measured position signals. The diagnosis device can be configured to perform broad control or monitoring functions. In an exemplary embodiment, the diagnosis device is formed by a micro-chip, which is either operated from a working fluid power supplied from the self-operated regulator, or has an autonomous energy supply (e.g. a battery or accumulator). In an exemplary embodiment, the diagnosis device includes processor circuitry that is configured to perform one or more operations and/or functions of the diagnosis device.

The communication between the magnetic sensor, the diagnosis unit and/or the display is preferably implemented via a cable or wirelessly using appropriate signal transmission.

In an exemplary embodiment, the magnetic field source is mounted adjacent to the control valve, in particular adjacent to a throttling body of the control valve, so that in particular the magnetic sensor is accommodated in the area of the arrangement of the magnetic field source on the outer side of the control valve housing. For the protection of the magnetic sensor, a separate housing can be provided, which may have a transparent outer casing, to enable information from the magnetic sensor to be recorded visually from the outside.

In an exemplary embodiment, the magnet is releasably fastened to the force transmission part of the self-operated regulator.

In an exemplary embodiment, the magnetic sensor includes the magnetic field source, one or more magnetic sensor elements, and/or one or more other electronic components (e.g. circuits and/or processors). The magnetic sensor can have a separate electrical energy supply (e.g. a battery or by an electric accumulator), but is not limited thereto.

In an exemplary embodiment, the docking station of the magnetic sensor includes a communication interface configured to transfer data, in particular position signals, to a control station or a control room. In an exemplary embodiment, the communication interface can be configured to perform wireless transmissions of the data to an external station, such as a control station or a control room. In an exemplary embodiment, the communication interface includes one or more transceivers and processor circuitry, where the processor circuitry is configured to perform one or more wireless communications using the one or more transceivers.

In an exemplary embodiment, the magnetic sensor (e.g. diagnosis device) is configured to read out the data necessary for the identification of the respective regulator using, for example, RFID, NFC, QR code or barcode data, but is not limited thereto.

In an exemplary embodiment, the magnetic sensor (e.g. diagnosis device) is configured to execute a calibration run on each installation of the regulator.

In an exemplary embodiment, the magnetic sensor includes a memory to store measurement data of the respective regulator. The memory can be part of the diagnosis device, externally located, or a combination of both. The memory can be operated by the autonomous energy source of the magnetic sensor.

The present disclosure also relates to a positioning sensor system having at least one self-operated regulator configured according to one or more exemplary embodiments described herein. The positioning sensor system can be configured to regulate a working fluid stream, in particular of a processing plant having a plurality of self-operated regulators. In an exemplary embodiment, the positioning sensor system can include a magnetic sensor, which is configured to detect a magnetic field of a magnetic field source. In an exemplary embodiment, the magnetic sensor includes one or more magnetic sensor elements (e.g. magnetic sensor circuits), such as one or more Hall elements and/or AMR sensors. The magnetic field source is arranged to follow the movement of the control valve of the regulator and generates a magnetic field, which is to be detected by the magnetic sensor. On the basis of the movement of the magnetic field relative to the stationary magnetic sensor arranged on the regulator, the position of the magnetic field source, and therefore of the control valve of the regulator, can be detected. The magnetic sensor can be attached to a carrier that is designed to cooperate with the regulator housing, in particular control valve housing, actuator housing or a housing structure connecting the control valve housing to the actuator housing, such that a locationally defined insertion position of the magnetic sensor relative to the regulator housing is achieved. Alternatively, the magnetic sensor can be pre-installed within the regulator (e.g. the regulator housing), on a regulator-specific basis, so that each regulator has a sensor located in the magnetic field of the moving magnet. The magnetic sensor can have its own separate power source, such as an electric battery or an electric accumulator, and/or have a shared power source. The magnetic sensor without its own power source can be supplied with energy by mounting a contactless electrical energy supply through a coil arrangement around the outside of the housing structure of the self-operated regulator. To this end, a non-magnetic material should preferably be used to form the housing section adjacent to which the sensor and the power supply coil are placed. In this example, the outer housing structure of the regulator can have an axial stop to position the energy providing coil adequately, in particular preferably optimally, in relation to the sensor to be energized. In this way, the magnetic sensor is only energized when the measurement is being carried out, for example by an operator. The carrier is preferably designed for docking to a plurality of identical and similar housing structures, so that a stationary relative position of the magnetic sensor unit is obtained with respect to the control unit. In particular, the regulator housing can have a docking station customized to the sensor profile for accommodating the magnetic sensor unit. In an exemplary embodiment, the docking stations of the plurality of regulators are structured identically or similarly, so that one and the same carrier of the magnetic sensor under consideration is dockable to the docking stations to provide the stationary positioning.

In embodiments having a mobile magnetic sensor, an operator can go from regulator to regulator to record the position of the specific control valve. To take account of regulator-specific characteristics, the magnetic sensor can have a readout device with which device-specific information can be recorded and evaluated. For this purpose, the magnetic sensor can include, for example, a barcode detector, which can scan the barcode located on the outer side of the regulator housing to obtain the device-specific information.

With a positioning sensor system according to one or more embodiments, it is possible using a mobile or handheld magnetic sensor to monitor a plurality of self-operated regulators, by virtue of an operator positioning the magnetic sensor by utilizing the docking station, and recording the position of the magnetic field source, ergo the control valve.

FIG. 1 illustrates a self-operated regulator according to an exemplary embodiment of the present disclosure and is assigned the reference numeral 1. In the regulator 1, the particular design of a pressure limiter or pressure regulator is shown, in which a diaphragm construction in the actuator 5 of the regulator 1 is directly or indirectly acted upon by the operating pressure of the medium/working fluid which is to be regulated. In an exemplary embodiment, in the self-operated regulator 1, the energy is extracted from the medium whose state is to be regulated. In the example shown, using the medium pressure (may also be done actively by utilizing the thermal material properties of the medium), a control pressure is built up using the self-operated regulator 1, which generates the required actuating force and delivers it to the control valve 3.

As shown in FIG. 1, the control valve is assigned the reference numeral 3, while the control actuator receives the reference numeral 5. In an exemplary embodiment, the control valve 3 is fastened to the control actuator 5 via a tubular housing structure 7 in a mutually supporting manner. In an exemplary embodiment, the control valve 3 has a valve body 11, which in relation to a valve seat 13 can control a pressure difference across the releasing passage surface between the seat and the valve cone. For example, in a rest state the control valve 3 can be closed by the force of the springs 15.

In an exemplary operation, with a pressure difference ($p_1$-$p_2$) of, for example, 0.2 bar or 0.3 bar or 0.35 bar or 0.4 bar or 0.5 bar or 0.55 bar up to 2 bar, the control valve 3 can be fully opened. The upstream pressure $p_1$ must be greater than the downstream pressure $p_2$. If the pressure $p_2$ behind the control valve 3 increases and reaches or exceeds the upstream pressure, the device closes automatically, also under the influence of the pre-tensioned spring 15.

In an exemplary embodiment, the control actuator 5, which has two working chambers 25, 27 is activated by via control lines 21, 23. The $p_2$-line 21 is coupled to the working chamber 27, while the $p_1$-line is coupled to the return chamber 25. A movable double diaphragm structure 31 separates the two chambers 25, 27. The double diaphragm structure 31 comprises a control diaphragm 31$a$, to which the (positive) actuating pressure $p_1$ is applied. An actuator diaphragm 31$b$ is acted upon by the negative pressure $p_2$ via the $p_2$-line 21. As described above, the control actuator 5 actuates the control valve 3 at an overpressure of $p_1$-$p_2$ pressure depending on a triggering pressure, which can be adjusted through the interaction between the pressure chamber and the working surface and the spring constant of the working spring 15 that is used. The double diaphragm structure 31 is coupled via a control rod 41 facing away from the control valve 3, which is completely guided in a non-magnetic housing 43. At the axial end of the control rod 41 a guiding region is provided, which guides the axial end 45 of the control rod in the longitudinal direction thereof in the manner of a sliding guide. At this axial end 45 a permanent magnet 47 is also accommodated, which generates a magnetic field which can readily pass through the non-magnetic material of the housing 43.

On the outer side of the non-magnetic housing part 43 of the drive housing 51 a magnetic sensor 53 is arranged, which can have one or more magnetic sensor elements 55 (e.g. magnetic sensor circuits), such as one or more a Hall elements and/or AMR sensors 55, but is not limited thereto. The magnetic sensor 53 can be removably placed onto the cone-shaped housing end 43 of the drive housing 51, wherein in the docking position shown in the FIGURE any movement of the magnetic sensor 53 relative to the drive housing 51 is prevented by a detachable fastening device, not shown in detail. The magnetic sensor 53 also has a communication interface 57, which is coupled to a diagnosis and display device 61.

When an axial movement of the control rod 41 relative to the Hall-effect sensor or AMR Sensor 55 occurs, the change of the associated field is detected and transmitted as a position change via the communication interface 57 to the diagnosis and display unit 61.

As illustrated in FIG. 1, the transmission of the position signals to the diagnosis and display unit 61 is implemented via a cable. It should be clear that a wireless signal transmission is also feasible.

In an exemplary embodiment, the magnetic sensor 53 can be configured to be compatible with a plurality of regulators in terms of measurement technology, if these should only have one magnetic field source which follows the motion of the control valve at least in a predictable manner. The magnetic sensor 53, in particular its carrier 54, can then be configured in such a way that it is able to dock onto the plurality of regulators in a positionally reliable way to detect the relative movement of the magnetic field source. A cylindrical support 48 of the carrier 54 with respect to a cylindrical engagement structure of the regulator housing 43 can then be provided, to ensure an axial mounting wherein the axial fixation of the magnetic sensor 53 relative to the housing 43 can be additionally achieved, for example, by a clamping device, not shown in detail.

In an exemplary embodiment, an operator can carry the mobile magnetic sensor 53 from regulator to regulator and then immediately take measurements relating to the position of the control valve 3. If device-specific information should be required, the magnetic sensor can have a readout device (not shown in detail), with which, for example, an information source attached to the outer side of the regulator housing 43 can be read out.

The features disclosed in the present description, claims and the drawings can be of significance both individually and also in any desired combination for the implementation of the present disclosure in its various embodiments.

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 self-operated regulator
3 control valve
5 control actuator
7 coupling structure
11 valve body
13 valve seat
15 spring
21, 23 control line
25, 27 working chamber
31 double diaphragm structure
31a, 31b control diaphragm
41 control rod
45 axial end
43 non-magnetic housing
47 permanent magnet
51 drive housing
53 magnetic sensor)
55 sensor element/circuit (e.g. Hall sensor, AMR sensor)
57 communication interface
61 diagnosis device and display
$p_1$ upstream pressure
$p_2$ downstream pressure

The invention claimed is:

1. A positioning sensor system comprising:
a self-operated regulator including:
a control valve;
a control actuator configured to receive supply energy, to operate the control valve with an operating force, exclusively from the stream of working fluid and/or from the working fluid itself; and
a magnetic field source coupled to the control valve such that the magnetic field source follows the movement of the control valve, wherein the control valve, the control actuator and the magnetic field source are housed in a fluid tight closed housing structure including a translational sliding bearing and a docking stop;
a magnetic field sensor configured to detect a magnetic field of the magnetic field source of the self-operated regulator to determine movement of the magnetic field source to detect a position of the control valve based on the determined movement; and
a carrier supporting the magnetic field sensor and configured to be removably positionable on the fluid tight closed housing structure of the self-operated regulator on an outside of the fluid tight closed housing structure to define a stationary position of the sensor relative to the fluid tight closed housing, wherein:
the magnetic field sensor and the carrier supporting the magnetic field sensor form a mobile hand-held magnetic field sensor that is configured to be selectively positioned and held, by an operator, at the stationary position on the outside of the fluid tight closed housing structure to detect a current position of the control valve based on the permanent magnetic field of the magnetic field source; and
the mobile hand-held magnetic field sensor is further configured to be selectively positionable on the fluid tight closed housing at a docking end position via the translational sliding bearing to selectively dock the mobile hand-held magnetic field sensor to fluid tight closed housing at the docking end position to detect the current position of the control valve based on the permanent magnetic field of the magnetic field source, the mobile hand-held magnetic field sensor being insertable into the docking end position and limited to a final position in a translational contacting direction by the docking stop.

2. The positioning sensor system according to claim 1, wherein:
the magnetic field source is attached to a control rod that is force-fittingly coupled to the control valve; and
an attachment position is arranged on the control rod adjacent to an axial end of the control rod opposite to the control valve and at a side of the control actuator facing away from the control valve, or the attachment position is arranged at the side of the control actuator facing away from the control valve.

3. The positioning sensor system according to claim 1, wherein:
the fluid tight closed housing structure of the regulator is adjacent to the magnetic field source, and
the fluid tight closed housing structure is made of a non-magnetic material.

4. The positioning sensor system according to claim 3, wherein the non-magnetic material comprises aluminum, austenitic steel, brass, bronze, and/or plastic.

5. The positioning sensor system according to claim 3, wherein the housing is made of the non-magnetic material along at least a complete amplitude of control movement of the magnetic field source.

6. The positioning sensor system according to claim 1, wherein the magnetic field sensor is configured to be communicatively coupled to a display and/or to a diagnosis device.

7. The positioning sensor system according to claim 1, wherein the magnetic field source is releasably attached to the control valve adjacent to a throttling body of the control valve.

8. The positioning sensor system according to claim 1, wherein the magnet field sensor includes one or more magnetic field sensor elements powered by a distinct power supply.

9. The positioning sensor system according to claim 8, wherein the distinct power supply comprises a battery or an accumulator.

10. The positioning sensor system according to claim 1, wherein the magnetic field sensor comprises a communication interface configured to wirelessly transfer position data to a master control station.

11. The positioning sensor system according to claim 1, wherein the magnetic sensor is configured to read identification data of the respective self-operated regulator.

12. The positioning sensor system according to claim 11, wherein the magnetic field sensor is configured to read an RFID tag, an NFC tag, a QR code, or a barcode to read the identification data.

13. The positioning sensor system according to claim 1, wherein the magnetic field sensor is configured to conduct a calibration operation upon each start-up of the self-operated regulator.

14. The positioning sensor system according to claim 1, wherein the magnetic field sensor comprises a data storage to store measurement data of the respective self-operated regulator.

15. The positioning sensor system according to claim 1, wherein the magnetic field sensor comprises one or more magnetic field sensor elements configured to detect a magnetic field generated by the magnetic field source.

16. The positioning sensor system according to claim 1, wherein the carrier supporting the magnetic field sensor is configured to be dockable to the fluid tight closed housing structure.

17. The positioning sensor system according to claim 16, wherein the carrier is configured to be compatible to a plurality of standardized docking stations of the self-operating regulator.

18. The positioning sensor system according to claim 1, wherein the carrier further comprises a cylindrical support and the fluid tight closed housing structure further comprises a cylindrical engagement structure, the cylindrical support is respectively associated with the cylindrical engagement structure to ensure an axial mounting and an axial fixation of the magnetic sensor relative to the fluid tight closed housing.

* * * * *